Patented Mar. 19, 1935

1,994,682

UNITED STATES PATENT OFFICE 1,994,682

WATER PURIFYING MATERIAL AND METHOD OF PREPARING AND USING THE SAME

George Borrowman, Evanston, Ill.

No Drawing. Application August 24, 1932, Serial No. 630,318. Renewed January 31, 1934

6 Claims. (Cl. 210—23)

This invention relates to the improvement of humic substances such as peat, lignite or brown coals for use in water purification, as more fully hereinafter described and as claimed.

Humic substances are the result of the decay of vegetable matter. The alteration involves the formation of acidic compounds known as humus acids and in the products mentioned above these acids are more or less neutralized by contact with bases of ground waters forming brownish compounds such as calcium and magnesium humates. These latter compounds as described in my Patent No. 1,793,670, are capable of base exchange as for example with sodium chloride in solution. Thus in the latter reaction the corresponding sodium humate is formed which is capable of softening water. The simple humates are somewhat soluble in water, imparting a yellow or brownish color, especially if the water is alkaline or low in concentration of electrolytes. This discoloration is objectionable in water for some purposes, such as for drinking and certain industrial uses.

It has been proposed to correct this trouble by treating the latter with solutions of the acid salts of aluminum, such as alum or aluminum sulphate. These solutions are somewhat effective partly due to the astringent effect of the acidity and partly to the deposition of a superficial coating of basic aluminum compounds on the granules, thus lessening the availability of the humates to contact with water. But such protective coating must therefore also interfere with the purifying functions of the humates and in the case of water softening, I find the rate of exchange and capacity diminished.

I propose to use a process of treating humic substances to lessen their solubility by converting them to more complex bodies. I find that simple humates may be changed to much more resistant substances by treating them with alkaline solutions of metals whose oxides are substantially insoluble in water such as alkaline solutions of aluminum, copper, cobalt, nickel, etc., the alkalies being the hydroxides of sodium, potassium, ammonium, etc. As examples of such solutions, I mention sodium aluminate prepared by dissolving aluminum hydroxide in alkali solution or by adding the alkali to a solution of an aluminum salt in amount sufficient to redissolve the precipitate of aluminum hydroxide and ammoniacal solution of copper, nickel, cobalt or silver oxide or hydroxide, prepared by dissolving the oxide or hydroxide in ammonia or by treating solutions of salts of these metals with ammonia in amount sufficient to redissolve the precipitate first formed.

When a humic substance such as lignite is treated with such alkaline solutions, both alkali and metal are taken up by the humate, displacing the original base of the latter. For example, if lignite, which consists largely of calcium humate, is treated with ammoniacal copper solution, the ammonium radicle and the copper replace the calcium in the humate forming the complex ammonium copper humate. In this compound the ammonium radicle is exchangeable in base exchange reactions while the copper is fixed. If the lignite is treated with a solution of aluminum hydroxide in sodium hydroxide (sodium aluminate) sodium and aluminum are taken up by the humic substance forming sodium aluminate humate, sodium being the mobile element. Such substances have the original or greater exchange activity and are much more resistant to the solvent action of water, despite the fact that treatment with alkaline solutions generally render the humates more soluble.

My preferred procedure is as follows:—Lignite is granulated and screened to —20 +50 mesh size. The granules are then treated for one-half hour with boiling 1% solution of sodium aluminate. I have found most satisfactory commercial powdered sodium aluminate and that the use of about 24 grams of such powdered sodium aluminate per pound gives satisfactory results. It is convenient to treat the lignite with successive portions of the 1% solution. Stronger solutions may be used but the weaker solutions are preferable. The treated material is washed free of excess aluminate and suspended matter and is ready for use.

As an illustration of the improvement in the stability of the product prepared as above, the following laboratory experiment is recorded. A quantity of lignite granules screened —20 +50 mesh, treated with sodium aluminate solution as described, was made up as a filter bed supported by gravel in the common manner of using a base exchange material. The dimensions of the bed were about 40"x½" (60 grams), thus fairly representing a longitudinal section of a commercial size filter bed. Chicago city water was filtered downwardly at 30 c. c. per minute until calcium appeared in the effluent. The bed was then regenerated with 150 c. c. of 3% common salt solution and then washed free of excess salt with 150 c. c. of Chicago city water. Filtration of the latter downwardly was then again started at a rate of 30 c. c. per minute. The first 65 c. c. of the effluent following the wash were collected for color and pH measurements. Filtration was continued until calcium appeared in the effluent. The softening cycle and measurements were repeated a number of times. At first the effluent was alkaline to phenolphthalein due to excess of sodium aluminate. The solvent action of this alkaline effluent was greater than when the pH of the effluent became the same as the raw water. Consequently the color of the effluent in the first cycles was higher than subsequently. When the pH of the effluent became the same as that of the raw water the color measurement showed an average of about 26 at the start and this rapidly decreased to zero. A bed of untreated lignite tested in a parallel manner gave a color reading of about 200. Several cycles were then run in which the bed was allowed to stand idle for 15 hours, after the regeneration and washing, in contact with city water. At the end of the idle period the water in contact with the bed was drawn off and is color measured. The latter averaged 88, whereas similarly tested untreated lignite gave a color of 400. The softening capacity of the bed was equal to that of the raw lignite.

I find that products as described above have additional advantageous features. For example, they tend less to air slake when dried and exposed to atmospheric conditions. The treated lignite also is much more readily wet by water, the raw lignite having a tendency to float on account of adsorbed air.

I claim as my invention:—

1. A water purifying product comprising a humic substance which has been treated with an alkaline solution of a metal whose oxides are insoluble in water.

2. A water purifying product comprising lignite or brown coal granules which have been treated with an alkaline solution of a metal whose oxides are insoluble in water.

3. A water purifying product which comprises a humic substance which has been treated with a solution of sodium aluminate.

4. A water purifying product comprising lignite or brown coal which has been treated with a solution of sodium aluminate.

5. A water purifying product comprising lignite or brown coal that has been treated with an ammoniacal solution of a metal whose oxides are insoluble in water.

6. A water purifying product comprising a humic substance that has been treated with an ammoniacal solution of copper.

GEORGE BORROWMAN.